(12) United States Patent
Foerst et al.

(10) Patent No.: US 7,975,678 B2
(45) Date of Patent: Jul. 12, 2011

(54) EXHAUST- GAS RECIRCULATION CONTROL RESPONSIVE TO A LOAD SIGNAL AT AN IN LINE INJECTION PUMP

(75) Inventors: Heinz-Georg Foerst, Cologne (DE); Karl Lutter, Overath (DE); Eckhard Haas, Cologne (DE)

(73) Assignee: DEUTZ Aktiengesellschaft, Cologne (DE)

( * ) Notice: Subject to any disclaimer, the term of this patent is extended or adjusted under 35 U.S.C. 154(b) by 658 days.

(21) Appl. No.: 11/792,880

(22) PCT Filed: Dec. 8, 2005

(86) PCT No.: PCT/EP2005/013147
§ 371 (c)(1),
(2), (4) Date: Jun. 20, 2008

(87) PCT Pub. No.: WO2006/066737
PCT Pub. Date: Jun. 29, 2006

(65) Prior Publication Data
US 2008/0257318 A1    Oct. 23, 2008

(30) Foreign Application Priority Data
Dec. 17, 2004 (DE) .......................... 10 2004 060 841

(51) Int. Cl.
*F02M 25/07* (2006.01)
*F02B 47/08* (2006.01)
(52) U.S. Cl. .............................. 123/568.21; 123/568.12
(58) Field of Classification Search ............... 123/41.31, 123/568.11–568.13, 568.21; 60/605.2
See application file for complete search history.

(56) References Cited

U.S. PATENT DOCUMENTS

| 4,020,809 | A |   | 5/1977  | Kern et al. ................ 123/119 A |
| 4,157,081 | A |   | 6/1979  | Wake et al. ............... 123/119 A |
| 4,208,995 | A | * | 6/1980  | Simko et al. ............. 123/568.28 |
| 4,230,080 | A | * | 10/1980 | Stumpp et al. ........... 123/568.18 |
| 4,295,455 | A |   | 10/1981 | Yasuhara et al. .............. 123/569 |
| 4,426,980 | A |   | 1/1984  | Eisele et al. |
| 6,378,508 | B1|   | 4/2002  | Braun et al. .................. 123/568 |
| 6,530,356 | B2| * | 3/2003  | Inoue et al. ................ 123/41.74 |

FOREIGN PATENT DOCUMENTS

| DE | 24 09 774    | A1 |   | 9/1975  |
| DE | 30 11 595    | C2 |   | 10/1981 |
| DE | 199 12 317   |    |   | 9/2000  |
| DE | 4207275      | A1 |   | 9/2009  |
| EP | 0 579 967    | A2 |   | 1/1994  |
| FR | 2721349      | A1 | * | 12/1995 |
| GB | 2215778      | A  | * | 9/1989  |
| JP | 63201309     | A  | * | 8/1988  |
| JP | 01155051     | A  | * | 6/1989  |
| JP | 2002339809   | A  | * | 11/2002 |

* cited by examiner

*Primary Examiner* — Willis R Wolfe, Jr.
(74) *Attorney, Agent, or Firm* — Davidson, Davidson & Kappel, LLC

(57) ABSTRACT

An exhaust gas recirculation control system for internal combustion engines includes an intake pipe (1) for delivering combustion air to the individual combustion chambers, an exhaust pipe (2) for discharging the exhaust gases from the combustion chambers, an exhaust gas recirculation line (3) that connects the intake pipe (1) and the exhaust pipe (2), and a mechanical injection pump (4) which is controlled by a control rod (5) is disclosed. An electrically controlled EGR valve (exhaust gas recirculation valve) (6) is located in the exhaust gas recirculation line (3) in order to control the effective cross section of the exhaust gas recirculation line (3) while an electrical pick-off device (7) determines the position of the control rod (5) and then controls the EGR valve (6).

10 Claims, 4 Drawing Sheets

EXHAUST-GAS RECIRCULATION CONTROL RESPONSIVE TO A LOAD SIGNAL AT AN IN LINE INJECTION PUMP

The present invention relates to an internal combustion engine having an intake pipe for delivering the combustion air to the individual combustion chambers, an exhaust pipe for removing the exhaust gas from the combustion chambers, an exhaust-gas recirculation line connecting the intake pipe and the exhaust pipe, and a mechanical injection pump which is controlled by a control rod.

BACKGROUND

Present-day exhaust-gas recirculation systems (EGR) are typically controlled via an electronic injection device, a control unit (ECU) being provided for this purpose on the internal combustion engine. The EGR volume is controlled via a characteristic map which corresponds to the load states of the internal combustion engine.

Electronics or ECUs of this kind are entirely lacking in today's "mechanical" internal combustion engines which come equipped with an in-line injection pump. The only load signal present in these "mechanical" internal combustion engines is that which indicates the position of the control rod at the injection pump.

The German Patent DE 199 12 317 C2 describes an internal combustion engine, an EGR valve (exhaust gas recirculation valve) being located in the exhaust-gas recirculation line. An electronic control device is provided for controlling this EGR valve.

SUMMARY OF THE INVENTION

It is an object of the present invention to devise a controlled exhaust gas recirculation using simple means.

Since an electrically controlled EGR valve (exhaust gas recirculation valve) is located in the exhaust-gas recirculation line in order to control the effective cross section of the same, and an electrical pick-off device senses the position of the control rod and controls the EGR valve in accordance therewith, a controlled exhaust gas recirculation is devised for "mechanical" internal combustion engines using simple means.

An embodiment according to the present invention is characterized in that the electrical pick-off device is a proximity switch, which, at predefined positions of the control rod, transmits a signal to the EGR valve to open or close the same.

Another embodiment according to the present invention is characterized in that the electrical pick-off device is a contactless displacement transducer which continuously senses the position of the control rod and continuously controls the EGR valve in accordance therewith.

The internal combustion engine is preferably a compression ignition engine, respectively a Diesel engine.

The injection pump is advantageously an in-line injection pump.

Another embodiment of the present invention provides for an exhaust-gas recirculation system which remains unaffected by the exhaust manifold that is hot during operation.

This is accomplished in that the exhaust-gas recirculation system is located on the cylinder head side opposite the intake pipe and the exhaust pipe. The result of this placement at a distance from the exhaust pipe, which is substantially hotter than other components during operation, is a direct lowering of the temperature of the recirculated exhaust volume, without the need for additional special cooling measures. The cylinder head is preferably an individual cylinder head, which is bolted, together with the corresponding cylinder, to the crankcase. As a matter of course, the present invention also applies generally to a block cylinder head and to cylinders which are fabricated in one piece together with the crankcase.

In a further refinement of the present invention, channels which open out on the cylinder head side and communicate with the fresh-gas channel and the exhaust-gas channel, are recessed in the cylinder head (the fresh-gas channel and the exhaust-gas channel connect gas-exchange valves to the intake pipe and, respectively, to the exhaust pipe). The channels, whose cross section may be dimensioned to be substantially smaller than the aforementioned gas channels, may be configured at an appropriate location in the cylinder head and be included as integrally cast channels during manufacture of the cylinder head or be subsequently introduced in a mechanical machining process. These channels are preferably introduced into the cylinder head in a subsequent mechanical machining process, so that the design of the cylinder head blank may be identical for internal combustion engine versions which feature exhaust gas recirculation and for those that do not. An exhaust-gas recirculation system, which includes an exhaust-gas recirculation manifold, an EGR valve and an exhaust-gas distribution line, is then able to be readily mounted at these channels which open out on the cylinder head side. In this context, a further advantage is derived in that the exhaust pipe may remain unchanged as compared to a design without exhaust-gas recirculation. This is particularly advantageous when different types of exhaust pipes having different connections for directing the exhaust gases are provided for various application purposes and customer requirements. In addition, the construction volume of the internal combustion engine that is relevant for an installation is not affected by this design and arrangement of the exhaust-gas recirculation system, so that the need is eliminated for distinguishing between an internal combustion engine that has exhaust-gas recirculation and one that does not. This is especially advantageous with regard to the interchangeability of equivalent internal combustion engines that are installed in construction machinery or agricultural machines.

In a further refinement of the present invention, the internal combustion engine has a cooling-air blower, and the exhaust-gas recirculation system is configured directly in the cooling-air flow supplied by the cooling-air blower. This arrangement allows the recirculated exhaust gas to be effectively cooled without requiring any further outlay. In addition, the exhaust-gas recirculation system may be integrated in a cooling-air duct which is formed from a cooling-air duct housing and is configured along the cylinder head side and thus, in any case, does not constitute a component that projects beyond a given lateral contour, thereby ensuring that an internal combustion engine correspondingly equipped with an exhaust-gas recirculation system is readily interchangeable with an identical internal combustion engine that does not have an exhaust-gas recirculation system. An internal combustion engine of this kind is preferably an air-cooled internal combustion engine. However, it may also be an internal combustion engine having a combination cooling system, the blower cooling the cooling medium, for example oil and/or water and, if indicated, being additionally utilized for air cooling of the cylinder head, for example.

In a further embodiment, the EGR valve is positioned adjacently to the cooling-air blower, so that this thermally sensitive component is cooled in a particularly effective and intensive manner. Finally, to enhance the cooling capacity, the exhaust-gas recirculation system may, in particular, have an outer ribbing, particularly with regard to optimized fluid mechanics, it being possible for this outer ribbing to be oriented in the direction of the cooling-air flow.

As previously explained, the exhaust-gas recirculation is switched on and off via an electrical control which evaluates a control-rod displacement signal. In this context, a Hall-effect sensor is preferably used, which is switched via one or more magnets integrated in the control rod. A Hall-effect sensor of this kind is a very reliable electrical switch which may be used for switching the exhaust-gas recirculation on and off. In another embodiment of the present invention, the exhaust-gas recirculation is switched off above an injected fuel quantity that corresponds to a load greater than three fourths of the full load. In this full-load range, no exhaust gas is recirculated, since an exhaust-gas recirculation carried out in the full-load range would lead to a degradation of the exhaust emissions. To this end, one preferred specific embodiment provides for a plurality of small magnets to be inserted side-by-side in bores, in the region of the control rod that covers this injected fuel-quantity range. These magnets switch the Hall-effect sensor mounted on the exterior of the pump housing of the injector. This method, respectively this embodiment, is extremely reliable, since the electrical control in question is explicitly not an electronic control device. Moreover, the exhaust-gas recirculation may be switched off at a speed below an elevated idling speed. This switching function is provided when, in response to decreasing speeds, for example to speeds below a threshold of 1500 rpm, there is the risk of smoke problems occurring during an exhaust-gas recirculation, due to the design of the injection system. For that reason, an inductive tachymetric switch is provided, which is likewise installed on the pump housing and emits the appropriate switch signal, in particular below a speed of 1450 rpm.

BRIEF DESCRIPTION OF THE DRAWINGS

Other advantageous embodiments of the present invention may be inferred from the description of the drawings, in which the exemplary embodiments of the present invention illustrated in the figures are described in greater detail.

DETAILED DESCRIPTION

Figure 1:
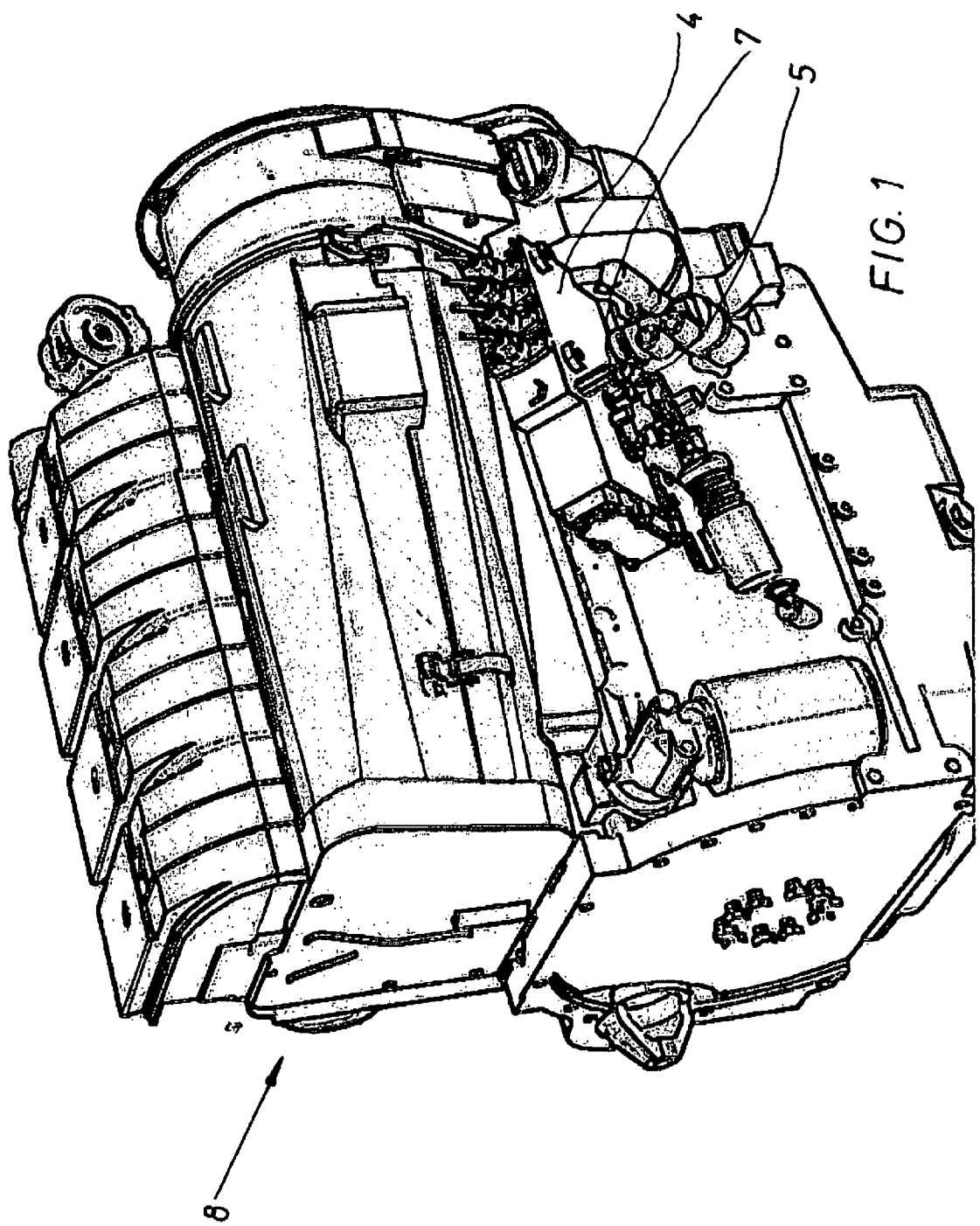
FIG. 1: shows a side view of an internal combustion engine on which the injection pump is mounted.
Figure 2:
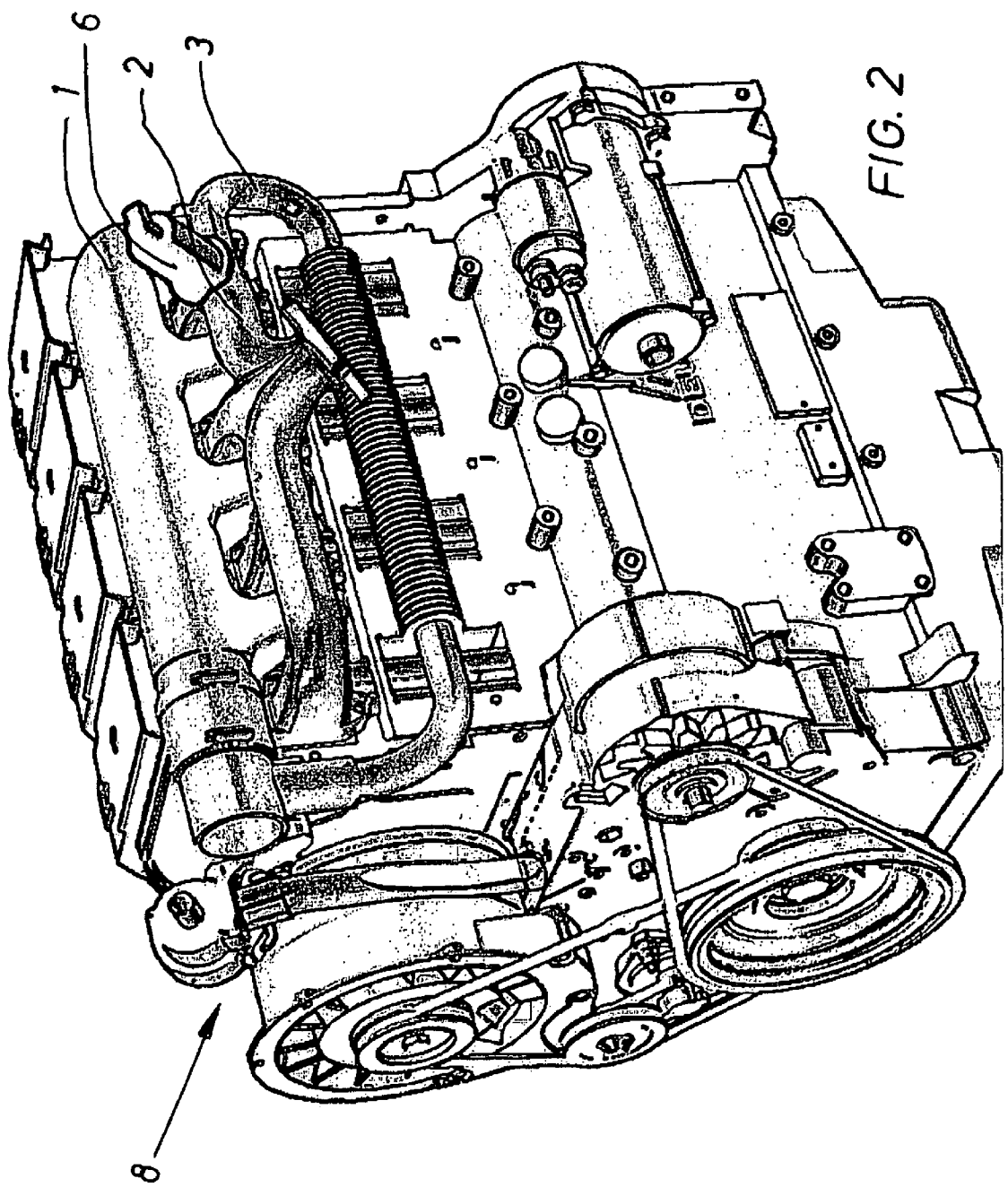
FIG. 2: illustrates the side of the internal combustion engine opposite that of FIG. 1, including the intake pipe, the exhaust pipe, and the exhaust-gas recirculation line.

The combustion air required for combusting the injected fuel arrives via an intake pipe 1 (FIG. 2) in the combustion chambers of compression ignition engine 8. The exhaust gases are removed via an exhaust pipe 2 in accordance with the combustion cycle. Exhaust pipe 2 communicates via an exhaust-gas recirculation line 3 with intake pipe 1 into which combustion air may also be delivered from a compressor of a turbocharger, for example. An electrically controlled EGR valve (exhaust-gas recirculation valve) 6, which is used to control the effective cross section of the exhaust-gas recirculation line, i.e., the volume of recirculated exhaust gas, is installed in exhaust-gas recirculation line 3.

An electrical pick-off device 7, which senses the position of control rod 5 and electrically controls EGR valve 6 in accordance therewith, is mounted on injection pump 4 in order to control EGR valve 6.

The pick-off device may preferably have two specific embodiments.

In a first specific embodiment, electrical pick-off device 7 is a proximity switch, which, at predefined positions of control rod 5, transmits a signal to EGR valve 6 to open or close the same.

In a second specific embodiment, electrical pick-off device 7 is a contactless displacement transducer which continuously senses the position of control rod 5 and continuously controls EGR valve 6 in accordance therewith.

By providing these features, a compression ignition engine 8 having an in-line injection pump is devised which makes it possible for the recirculated exhaust volume to be controlled without requiring additional electronics or ECUs.

Figure 3:
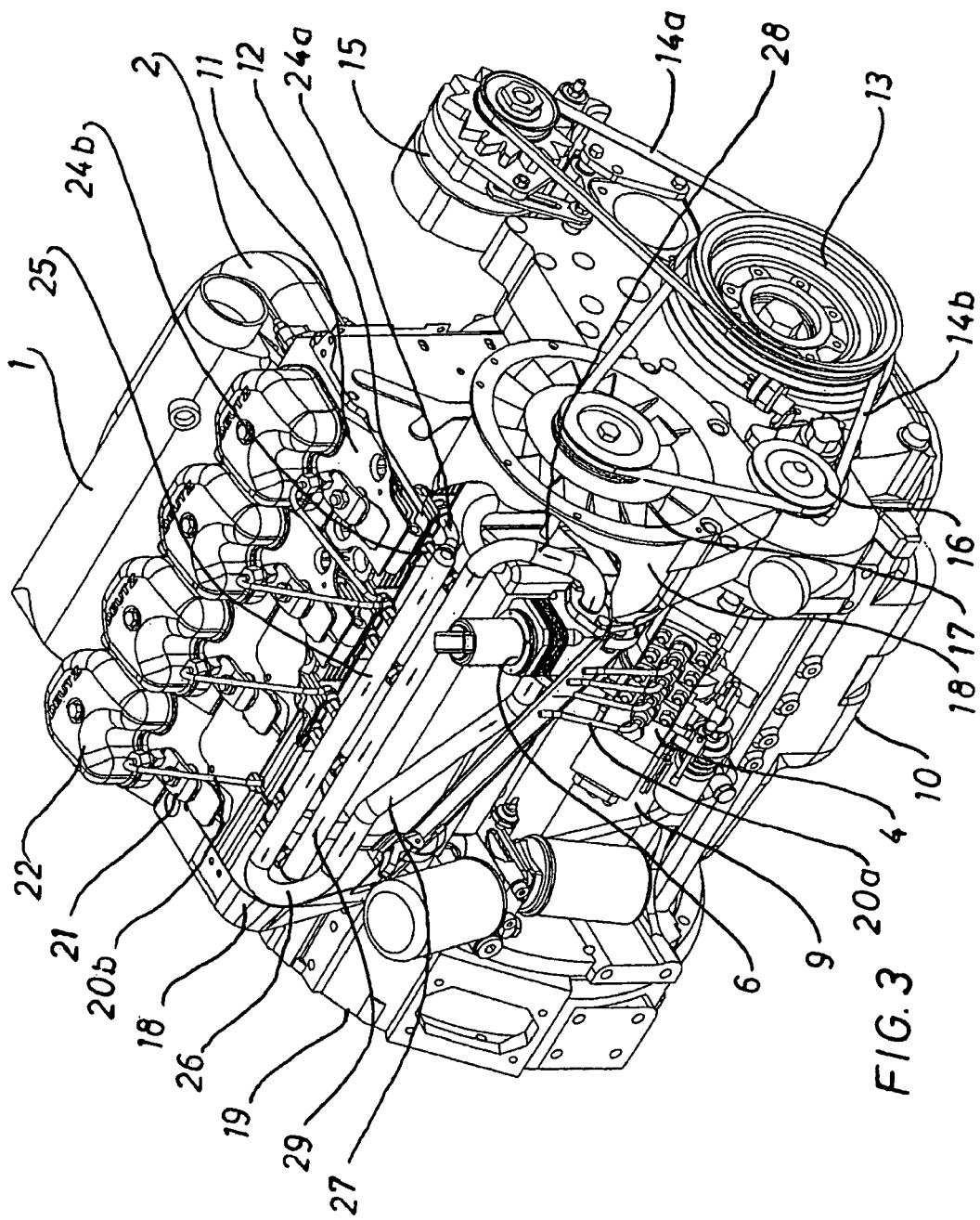
FIG. 3: shows a perspective view of an internal combustion engine having an open cooling-air duct housing, including a variant of the exhaust-gas recirculation system.

In the same manner as the previously described internal combustion engine, the internal combustion engine in accordance with FIG. 3 has a crankcase 9, which is sealed at the bottom by an oil pan 10. Attached to crankcase 9 oppositely to oil pan 10 are cylindrical pipes which are covered, in turn, by cylinder heads 11. The exemplary embodiment relates to a four-cylinder internal combustion engine, so that, altogether, four cylindrical pipes and four cylinder heads 11 are installed. Moreover, the internal combustion engine is air-cooled and, accordingly, the cylinder pipes and cylinder heads 11 are provided with cooling ribs 12.

Fastened at the front end of the internal combustion engine to a crankshaft supported in crankcase 9 is a double-belt pulley 13 which is operatively connected via a first V-belt 14a to a generator 15 and via a second V-belt 14b to a cooling-air blower 17, a tensioning roller 16 being interposed therebetween.

Cooling-air blower 17 is configured laterally above crankcase 9, essentially in the area next to the cylinder pipes and cylinder heads 11, and delivers cooling air drawn in from the ambient environment into a cooling-air duct housing 18, which extends from cooling-air blower 17 to an opposite output end 19 of the internal combustion engine and distributes the delivered cooling air across the internal combustion engine along the cylinder pipes and cylinder heads 11. In FIG. 3, a maintenance lid of cooling-air duct housing 18 is removed, and cooling-air duct housing 18 is shown partially cut open in the region of cooling-air blower 17, providing a view of the interior of cooling-air duct housing 18.

Installed below cooling-air duct housing 18 is an injection pump 4 designed as an in-line injection pump, which communicates via injection lines 20a, 20b, shown in an interrupted view, with fuel injectors inserted in cylinder heads 11. Each fuel injector is secured by a clamping claw 21 to the cylinder head and is laterally contiguous to a valve cover 22 which extends to a cylinder-head longitudinal side opposite the cylinder-head side on the side of the cooling-air duct housing. Intake pipe 1 and exhaust pipe 2 are configured on this cylinder-head longitudinal side. In the region above, between and below intake pipe 1 and exhaust pipe 2, a significant portion of the cooling air delivered by cooling-air blower 17 flows back into the ambient environment again.

Figure 4:
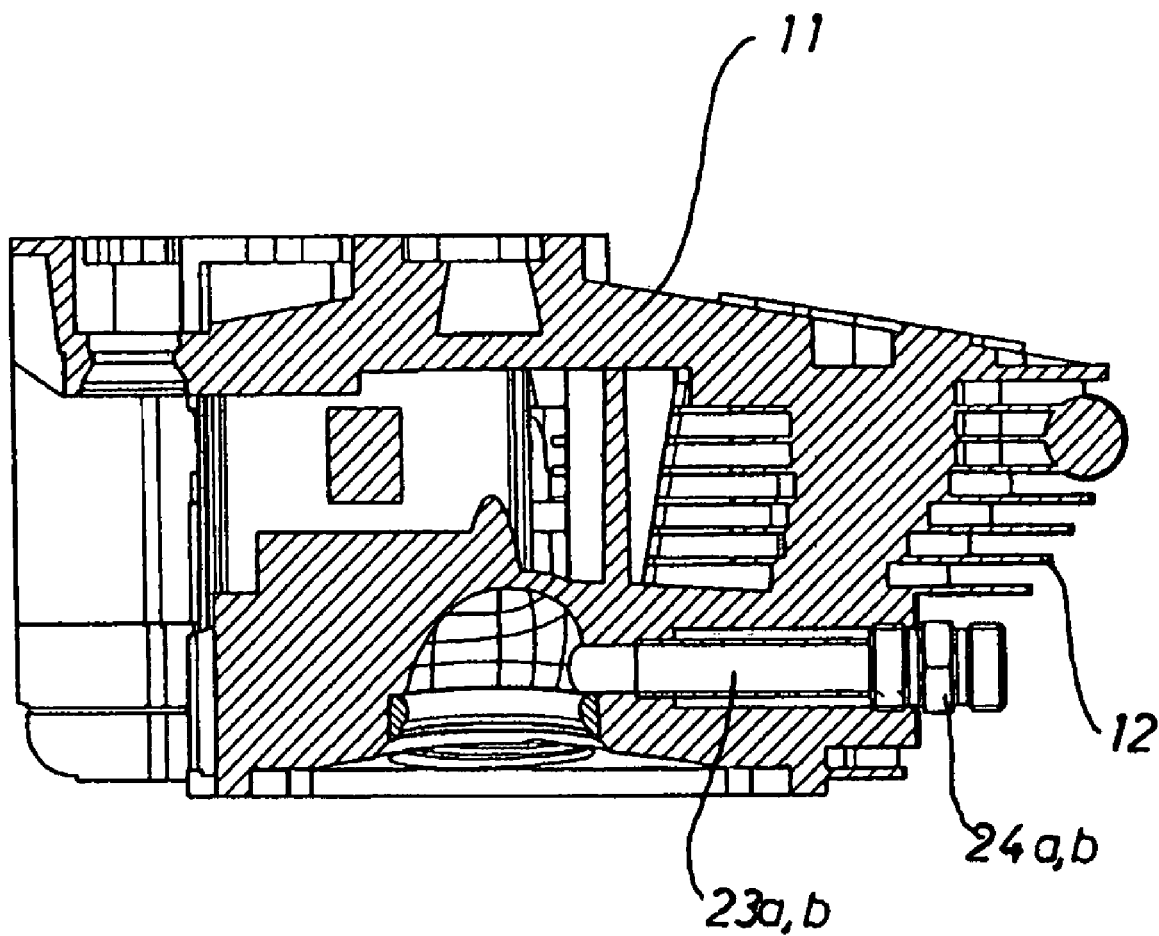
FIG. 4: depicts a cross section through a cylinder head in accordance with FIG. 3, in the area of a channel.

The combustion chambers located in the cylinders between individual cylinder heads 11 and the vertically reciprocating pistons in the respective cylinders, are each in fluid communication via gas-exchange valves and gas-exchange channels with intake pipe 1 and exhaust pipe 2. On the opposite cylinder-head side, channels 23a, 23b (FIG. 4) are introduced into cylinder heads 11. In a side-by-side configuration, one channel 23a communicates with a gas-exchange exhaust port and channel 23b with a gas-exchange intake port. These channels 23a, 23b extend in a lower region of cylinder head 11 to the cylinder head side on the cooling-air blower side and are provided with mating coupling devices 24a, 24b.

In this exemplary embodiment, the exhaust-gas recirculation system is configured in cooling-air duct housing 18 and connects channels 23a to channels 23b in a controllable and/or variable manner. To that end, channels 23a are interconnected with a common manifold 25, which extends in the area of output end 19 via an elbow 26 into a feed pipe 27 to exhaust-gas recirculation control valve 6. Connected to exhaust-gas recirculation control valve 6 on the side opposite feed pipe 27 is a deflector elbow 28 which leads into a distribution line 29 that is configured approximately in parallel below manifold 25 and is connected, in turn, to channels 23b of individual cylinder heads 11.

The entire exhaust-gas recirculation system is situated within cooling-air duct housing 18. Therefore, on the one hand, it is not visible from the outside when cooling-air duct housing is closed, and, on the other hand, it does not influence the outer dimensions of the internal combustion engine. In addition, by configuring the exhaust-gas recirculation device completely inside of cooling-air duct housing 18, an effective cooling of the components of the exhaust-gas recirculation system is achieved. The individual pipes and elbows, as well as the exhaust-gas recirculation-control valve housing may also be additionally provided with inner and/or outer cooling rips to enhance the transfer of heat.

In this exemplary embodiment, injection pump 4 is also equipped with a governor which is designed as a mechanical governor. In order to be able to actuate exhaust-gas recirculation control valve 6 without using a complicated and expensive electronic control device, in this case, the position of the control rod present in in-line injection pump 4 is picked off in a contactless manner, and this position is utilized for controlling exhaust-gas recirculation control valve 6 via a mechanical or electrical transmitting device.

This is accomplished via an electrical control which analyzes a control-rod displacement signal. In this context, a Hall-effect sensor is preferably used, which is switched via one or more magnets integrated in the control rod. A Hall-effect sensor of this kind is a very reliable electrical switch which may be used for switching the exhaust-gas recirculation on and off. In another embodiment of the present invention, the exhaust-gas recirculation is switched off above an injected fuel quantity that corresponds to a load greater than three fourths of the full load. In this full-load range, no exhaust gas is recirculated, since an exhaust-gas recirculation carried out in the full-load range would lead to a degradation of the exhaust emissions. To this end, one preferred specific embodiment provides for a plurality of small magnets to be inserted side-by-side in bores, in the region of the control rod that covers this injected fuel-quantity range. These magnets switch the Hall-effect sensor mounted on the exterior of the pump housing of the injector. This method, respectively this embodiment, is extremely reliable, since the electrical control in question is explicitly not an electronic control device.

In a further embodiment of the present invention, the exhaust-gas recirculation is switched off at a speed below an elevated idling speed. This switching function is provided when, in response to decreasing speeds, for example to speeds below a threshold of 1500 rpm, there is the risk of smoke problems occurring during an exhaust-gas recirculation, due to the design of the injection system. For that reason, an inductive tachymetric switch is provided, which is likewise installed on the pump housing and emits the appropriate switch signal, in particular below a speed of 1450 rpm.

LIST OF REFERENCE NUMERALS 1 intake pipe
2 exhaust pipe
3 exhaust-gas recirculation line
4 injection pump
5 control rod
6 EGR valve
7 pick-off device
8 internal combustion engine
9 crankcase
10 oil pan
11 cylinder head
12 cooling rib
13 double-belt pulley
14a, 14b V-belt
15 generator
16 tensioning roller
17 cooling-air blower
18 cooling-air duct housing
19 output end
20a, 20b injection line
21 clamping claw
22 valve cover
23a, 23b channel
24a, 24b coupling device
25 manifold
26 elbow
27 feed line
28 deflector elbow
29 distribution line

What is claimed is:

1. An internal combustion engine comprising:
an intake pipe for delivering combustion air to individual combustion chambers;
an exhaust pipe for removing exhaust gas from the combustion chambers;
an exhaust-gas recirculation line connecting the intake pipe and the exhaust pipe;
a control rod;
a mechanical injection pump controlled by the control rod;
an electrically controlled exhaust gas recirculation valve located in the exhaust-gas recirculation line in order to control an effective cross section of the exhaust-gas recirculation line; and
an electrical pick-off device sensing a position of the control rod and controlling the exhaust gas recirculation valve in accordance with the position.

2. The internal combustion engine as recited in claim 1 wherein the electrical pick-off device is a proximity switch, transmitting at predefined positions of the position of the control rod, a signal to the exhaust gas recirculation valve to open or close the exhaust gas recirculation valve.

3. The internal combustion engine as recited in claim 1 wherein the electrical pick-off device is a contactless displacement transducer continuously sensing the position of the control rod and continuously controlling the exhaust gas recirculation valve in accordance with the position.

4. The internal combustion engine as recited in claim 1 wherein the internal combustion engine is a compression ignition engine.

5. The internal combustion engine as recited in claim 1 wherein the injection pump is an in-line injection pump.

6. The internal combustion engine as recited in claim 1, further comprising a cylinder head, wherein the exhaust-gas recirculation system is located on a cylinder head side opposite the intake pipe and the exhaust pipe.

7. The internal combustion engine as recited in claim 6 wherein the cylinder head has channels opening out on the cylinder head side and communicating with a fresh-gas channel and an exhaust-gas channel.

8. The internal combustion engine as recited in claim 6 wherein the exhaust-gas recirculation system has an inner and an outer ribbing.

9. The internal combustion engine as recited in claim 6 further comprising a cooling-air blower, the exhaust-gas recirculation system being configured directly in cooling-air flow supplied by the cooling-air blower within a cooling-air duct housing.

10. The internal combustion engine as recited in claim 9 wherein the exhaust gas recirculation valve is positioned adjacently to the cooling-air blower.

* * * * *